US012627553B2

(12) United States Patent
    Kumar et al.

(10) Patent No.:    US 12,627,553 B2
(45) Date of Patent:        May 12, 2026

(54) SYSTEM AND DESIGN METHOD OF AN ETHERNET CONTROLLER OF A COMBINED CENTRALIZED AND DISTRIBUTED UNIT

(71) Applicant: JIO PLATFORMS LIMITED, Ahmedabad (IN)

(72) Inventors: Narender Kumar, Delhi (IN); Shakti Singh, Gurgaon (IN); Amrish Bansal, Navi Mumbai (IN); Brijesh Shah, Navi Mumbai (IN); Bajinder Pal Singh, New Delhi (IN); Selvakumar Ganesan, Tirupur (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,478

(22) PCT Filed: Mar. 24, 2023

(86) PCT No.: PCT/IB2023/052918
    § 371 (c)(1),
    (2) Date: Mar. 31, 2023

(87) PCT Pub. No.: WO2023/187569
    PCT Pub. Date: Oct. 5, 2023

(65) Prior Publication Data
    US 2025/0016040 A1    Jan. 9, 2025

(30) Foreign Application Priority Data
    Mar. 31, 2022    (IN) .............................. 202221019335

(51) Int. Cl.
    H04L 41/042        (2022.01)
    H04L 1/00          (2006.01)
    H04W 84/04         (2009.01)

(52) U.S. Cl.
    CPC .......... H04L 41/042 (2013.01); H04L 1/0057 (2013.01); H04W 84/047 (2013.01)

(58) Field of Classification Search
    CPC ........................... H04L 41/042; H04L 1/0057
    See application file for complete search history.

(56) References Cited

U.S. PATENT DOCUMENTS 8,942,561 B2 *    1/2015    Boyd .................... H04J 3/0658
                                                        398/154
    10,834,618 B1    11/2020    Sekar et al.
                                (Continued)

FOREIGN PATENT DOCUMENTS

WO    2017197267 A1    11/2017
    WO    2021080740 A1    4/2021
    WO    2022006106 A1    1/2022

OTHER PUBLICATIONS

International Search Report, PCT/IB2023/052918, mailed Jul. 12, 2023, Total pp. 04.

*Primary Examiner* — Nazia Naoreen

(74) *Attorney, Agent, or Firm* — FINNEGAN, HENDERSON, FARABOW, GARRETT & DUNNER, LLP

(57)                ABSTRACT

The present invention provides an efficient hardware architecture of an Ethernet controller to provide for connectivity interfaces to a combined centralized unit and a distributed unit (CCDU) for processing Level 1, 2 and 3 scheduling in a network. The CCDU design may provide the functionality of a CU and a DU as a single unit and the design of the Ethernet controller along with an eASIC comprising an accelerator unit is very important. A single board approach of the CCDU make the CCDU more reliable and less costly.

12 Claims, 6 Drawing Sheets

150

PERFORMING ANY OR A COMBINATION OF ENHANCED COMMON PUBLIC RADIO INTERFACE (ECPRI) AND ORAN FUNCTIONALITY — 152

PROVIDING CONNECTIVITY BY A BACKHAUL NIC (114) WITH CONFIGURED OPTICAL ETHERNET — 154

RECOVERING, BY A SYNCHRONIZATION BLOCK EQUIPPED INSIDE THE BACKHAUL NIC (114), A CLOCK SIGNAL FROM THE BACKHAUL NETWORK (112) — 156

SUPPORTING, BY A SOFT-DECISION FORWARD ERROR CORRECTION (SD-FEC) MODULE (116), A LOW DENSITY PARITY CHECK (LDPC) DECODING AND ENCODING AND TURBO CODE DECODING, WHEREIN THE SD-FEC MODULE (116) IS EQUIPPED INSIDE AN ACCELERATOR UNIT — 158

(56)                References Cited

U.S. PATENT DOCUMENTS

| | | | |
|---|---|---|---|
| 2017/0237484 A1* | 8/2017 | Heath ................... | H04L 43/045 |
| | | | 398/26 |
| 2017/0331497 A1 | 11/2017 | Richardson et al. | |
| 2018/0349160 A1* | 12/2018 | Iyer ..................... | G06F 9/45537 |
| 2019/0159277 A1 | 5/2019 | Zhu et al. | |
| 2021/0345143 A1 | 11/2021 | Notargiacomo et al. | |
| 2021/0409977 A1 | 12/2021 | Dussmann et al. | |
| 2022/0232423 A1* | 7/2022 | Thyagaturu ........... | H04W 28/10 |
| 2022/0286332 A1 | 9/2022 | Strobel et al. | |

* cited by examiner

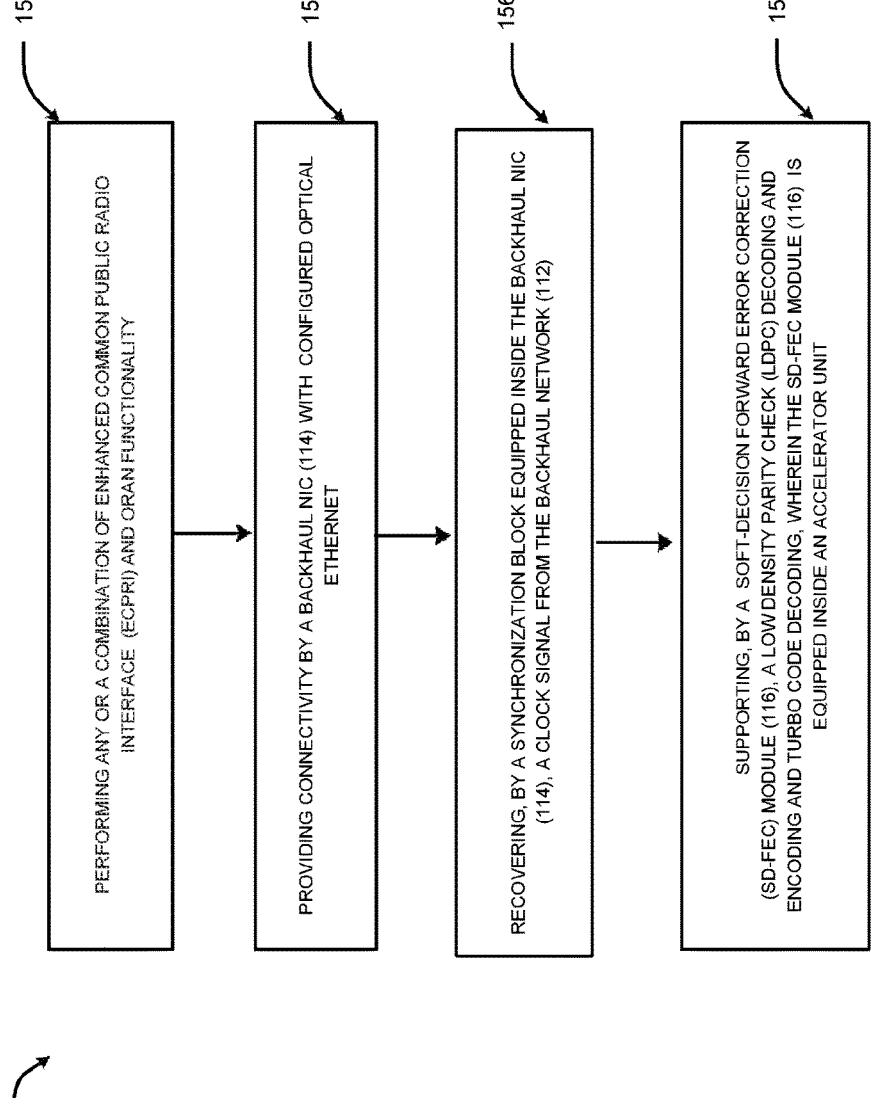

152

PERFORMING ANY OR A COMBINATION OF ENHANCED COMMON PUBLIC RADIO INTERFACE (ECPRI) AND ORAN FUNCTIONALITY

154

PROVIDING CONNECTIVITY BY A BACKHAUL NIC (114) WITH CONFIGURED OPTICAL ETHERNET

156

RECOVERING, BY A SYNCHRONIZATION BLOCK EQUIPPED INSIDE THE BACKHAUL NIC (114), A CLOCK SIGNAL FROM THE BACKHAUL NETWORK (112)

158

SUPPORTING, BY A SOFT-DECISION FORWARD ERROR CORRECTION (SD-FEC) MODULE (116), A LOW DENSITY PARITY CHECK (LDPC) DECODING AND ENCODING AND TURBO CODE DECODING, WHEREIN THE SD-FEC MODULE (116) IS EQUIPPED INSIDE AN ACCELERATOR UNIT

SYSTEM AND DESIGN METHOD OF AN ETHERNET CONTROLLER OF A COMBINED CENTRALIZED AND DISTRIBUTED UNIT

FIELD OF INVENTION

The embodiments of the present disclosure generally relate to telecommunication basement application. More particularly, the present disclosure relates to design of an ethernet controller of a combined centralized and distributed unit (CCDU).

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The fifth generation (5G) technology is expected to fundamentally transform the role that telecommunications technology plays in the industry and society at large. A gNodeB is a 3GPP-compliant implementation of a 5G-NR base station. It consists of independent Network Functions, which implement 3GPP-compliant NR Radio access network (RAN) protocols namely: physical layer (PHY), media access control layer (MAC), radio link control (RLC), Packet Data Convergence Protocol (PDCP), service data adaptation protocol (SDAP), radio resource control (RRC), Network Real-time Analysis Platform (NRAP) as shown in FIG. 1A. The gNB further incorporates three functional modules: the CU, the DU and the Radio Unit (RU), which can be deployed in multiple combinations. The CU and DU can run together or independently and can be deployed on either physical (e.g. a chipset) or virtual resources (e.g. dedicated COTS server or shared cloud resources). The CU provides support for the higher layers of the protocol stack such as SDAP, PDCP and RRC while the DU provides support for the lower layers of the protocol stack such as radio link control (RLC), media access control (MAC) and Physical layer. In a 5G radio access network (RAN) architecture, the DU in the baseband unit (BBU) is responsible for real time Layer 1 and Layer 2 scheduling functions of the 5G protocol stack layer and the CU is responsible for non-real time, higher L2 and L3 of the 5G protocol stack layer.

However, in existing architecture the DU and the CU units are physically separate and require exhaustive and complex methodologies and protocol support for the splitting of the gNB into the DU and CU. Splitting of CU and DU is the most outstanding in the gNB internal structure and these two entities are connected by a new interface called F1. In most existing gNB nodes, CU and DU are physically separate, that is, the CU and DU are on separate boards and hence the splitting becomes more expensive in terms of realization of temperature requirement, vibration, dust, humidity, latency, power, radiation loss, bandwidth, more dependence on possible interfaces and maintaining the parameters for both the CU and DU separately.

Normally, to make the server, the provider's uses network interface card such as PCIe card, which requires separate plugins, input sources, and other external connections. Furthermore, the present available technology cannot fulfil the requirement of high speed processing, on a single integrated chip, and is complex in nature.

Hence, there is a need in the art to provide for local area network controller that is embedded in a single integrated board and furthermore a compact CCDU that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide a system in a single unit to reduce cost and increase reliability.

An object of the present disclosure is to design a local area network controller Hardware that is on a single PCB approach by keeping all required SoC on board.

An object of the present disclosure is to provide a system that can manage one or more network interfaces in the single PCB.

An object of the present disclosure is to provide a system that operates at standard telecom power supply (−48 VDC) with all required protection for telecom sites.

Yet another object of the present invention is to provide high processing speed controller on an integrated chip.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present invention provides a controller system for a combined centralized and distributed unit (CCDU) system. The system may include a housing for the controller, the controller operatively coupled to a processing unit of the CCDU. The controller may be embedded in a single integrated board. The controller further may include an accelerator unit that may speed up a set of functionalities of the CCDU. The controller may include a fronthaul Network interface controller (NIC) that may be communicatively coupled with a radio unit (RU) (108) and a backhaul NIC communicatively operatively coupled to a backhaul network (112). The controller may further include one or more network interfaces.

In an embodiment, the Fronthaul NIC (116) may include one or more interfaces under evolved Common Public Radio Interface (eCPRI) protocol with the Radio unit.

In an embodiment, the Fronthaul NIC further may include a built-in synchronization block to perform any or a combination of enhanced Common Public Radio Interface (eC-PRI) and ORAN functionality.

In an embodiment, the Backhaul NIC may include connectivity with one or more optical Ethernet.

In an embodiment, the backhaul NIC further may include a synchronization block to recover a Clock signal from the backhaul network.

In an embodiment, the accelerator unit further may include a Soft-Decision Forward Error Correction (SD-FEC) module.

In an embodiment, the SD-FEC module may support a Low Density Parity Check (LDPC) decoding and encoding and Turbo code decoding.

In an embodiment, at least eight dynamic random-access memory integrated circuits or modules may be embedded in the single integrated board, and at least five 1 GB DDR4 may be connected with the single integrated circuit.

In an embodiment, the one or more interfaces may be connected with the processing unit (118) through the platform controller Hub (PCH) (320) associated with the single integrated board.

In an embodiment, the controller may be enabled by a local area network.

In an aspect, the present disclosure provides for a method performed by a network enabled controller system for a combined centralized and distributed unit (CCDU) system. The method may include the steps of performing any or a combination of enhanced Common Public Radio Interface (eCPRI) and ORAN functionality, providing connectivity by a the Backhaul NIC with configured optical Ethernet, recovering, by a synchronization block equipped inside the Backhaul NIC, a Clock signal from the backhaul network and supporting, by a Soft-Decision Forward Error Correction (SD-FEC) module, a Low Density Parity Check (LDPC) decoding and encoding and Turbo code decoding, wherein the SD-FEC module is equipped inside an accelerator unit.

In an aspect, the present disclosure provides a non-transitory computer readable medium including processor executable instructions that cause a processor to perform any or a combination of enhanced Common Public Radio Interface (eCPRI) and ORAN functionality, provide connectivity by a Backhaul NIC with configured optical Ethernet, recover, by a synchronization block equipped inside the Backhaul NIC, a Clock signal from the backhaul network, and support, by a Soft-Decision Forward Error Correction (SD-FEC) module, a Low Density Parity Check (LDPC) decoding and encoding and Turbo code decoding, wherein the SD-FEC module is equipped inside an accelerator unit.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 1C illustrates an exemplary method flow diagram of the present disclosure can be implemented, in accordance with an embodiment of the present disclosure.

Figure 1A:
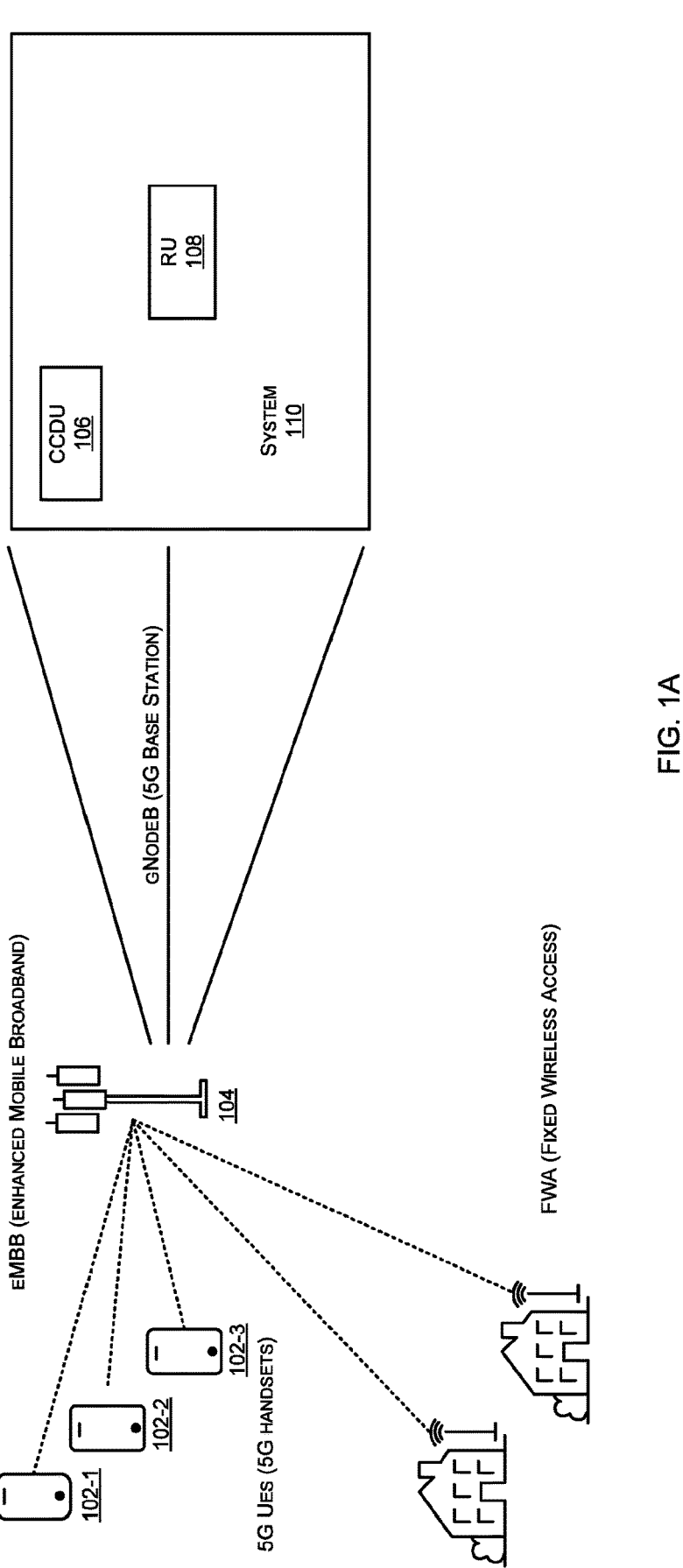
FIG. 1A illustrates an exemplary network architecture in which or with which proposed system of the present disclosure can be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the disclosure, various embodiments are described using terms used in some communication standards (e.g., 3rd generation partnership project (3GPP), extensible radio access network (xRAN), and open-radio access network (O-RAN)), but these are merely examples for description. Various embodiments of the disclosure may also be easily modified and applied to other communication systems.

Typically, a base station is a network infrastructure that provides wireless access to one or more terminals. The base station has coverage defined to be a predetermined geographic area based on the distance over which a signal may be transmitted. The base station may be referred to as, in addition to "base station," "access point (AP)," "evolved NodeB (eNodeB) (eNB)," "5G node (5th generation node)," "next generation NodeB (gNB)," "wireless point," "transmission/reception point (TRP)," or other terms having equivalent technical meanings.

Further, a protocol stack or network stack is an implementation of a computer networking protocol suite or protocol family for a telecommunication system consisting of a plurality of network devices. A 5G protocol stack may include layer-1 (L1) which is a PHYSICAL Layer. The 5G layer-2 (L2) may include MAC, RLC and PDCP. The 5G layer-3 (L3) is the RRC layer.

The present invention provides an efficient hardware architecture for an ORAN compliant internal structure of a base station or a next generation node B (gNodeB) comprising of a combined centralized unit and a distributed unit (CCDU) for a 5G basement application required for processing L1, L2 and L3 of the network. The CCDU design may provide the functionality of a CU and a DU with single unit and can operate over wide temperature range. A single board approach of the CCDU make the CCDU more reliable and less costly. The CCDU can support different kinds of synchronization and can provide site alarms over dry contacts to equip with external alarm device. In this description, numerous specific details such as logic implementations, types and interrelationships of system components, etc., may be set forth in order to provide a more thorough understanding of some embodiments. It will be appreciated, however, by one skilled in the art that the invention may be practiced without such specific details. In other instances, control structures, gate level circuits, and/or full software instruction sequences have not been shown in detail in order not to obscure the invention. Those of ordinary skill in the art, with the included descriptions, will be able to implement appropriate functionality without undue experimentation.

Referring to FIG. 1A that illustrates an exemplary network architecture for a 5G New radio (NR) network (100) (also referred to as network architecture (100)) in which or with which the proposed system (110) can be implemented, in accordance with an embodiment of the present disclosure. As illustrated, the exemplary network architecture (100) may be equipped with the proposed system (110) that may be associated with a 5G base station (104) (also referred to as gNodeB (104)). The gNodeB (104) may include at least three functional modules such as a centralized unit (CU), a distributed unit (DU) and a radio unit (RU). The gNodeB may be communicatively coupled to a plurality of first computing devices (102-1, 102-2, 102-3 . . . 102-N) (interchangeably referred to as user equipment (102-1, 102-2, 102-3 . . . 102-N) and (individually referred to as the user equipment (UE) (124) and collectively referred to as the UE (102)) via an Open radio access network Radio Unit (O-RU) (114).

Figure 1B:
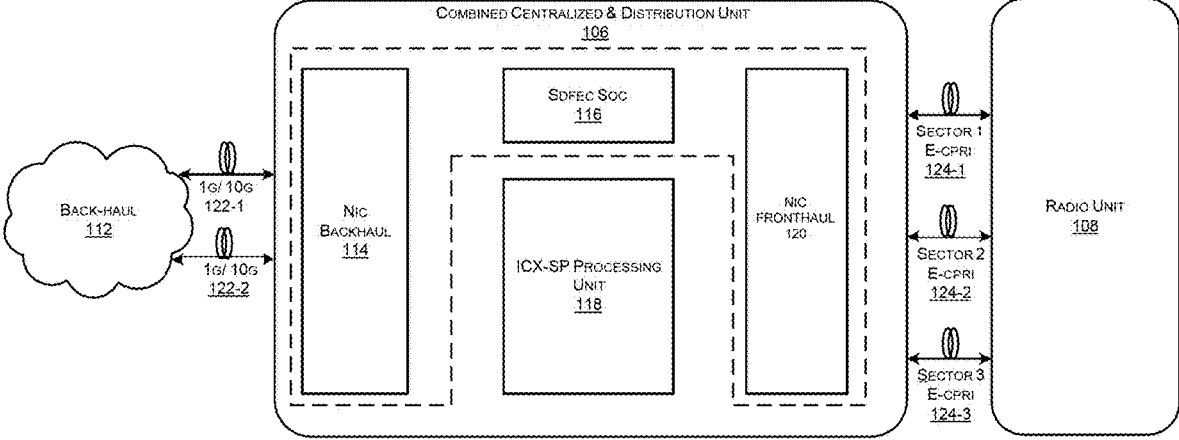
FIG. 1B illustrates an exemplary system architecture of the combined centralized and distributed unit (CCDU), in accordance with an embodiment of the present disclosure.

In an exemplary embodiment, the system (110) may be configured with a combined CU and DU in a single platform or PCB and is simply referred to as CCDU (106) as illustrated in FIG. 1B. The CCDU (106) may be enclosed in a single housing. The housing is provided with a cooling system that enables the CCDU to function in a predefined temperature.

In an embodiment, the CCDU (106) may be operatively coupled to a radio unit (RU) (108) via one or more Network interface card (NIC) cards. The CCDU (106) may include a processing unit (118), an accelerator unit that may include a Soft-Decision Forward Error Correction (SD-FEC) module (116), a local area network controller unit comprising a backhaul Network interface card (NIC) (114), a fronthaul NIC (120), and the like. The backhaul NIC (114) may be further communicatively coupled to a backhaul network (112).

FIG. 1C illustrates an exemplary method flow diagram (150) of the present disclosure can be implemented, in accordance with an embodiment of the present disclosure.

As illustrated, the method (150) is performed by the network enabled controller system for a combined centralized and distributed unit (CCDU) system and may include at 152, the step of performing any or a combination of enhanced Common Public Radio Interface (eCPRI) and ORAN functionality. For example, the eCPRI provides an interface between Radio Equipment Control (REC) and Radio Equipment (RE). Oftentimes, CPRI links are used to carry data between cell sites and base stations.

The method may also include at 154, the step of providing connectivity by a Backhaul NIC (114) with the configured optical Ethernet. For example, the backhaul NIC is the link between the network serving as the backbone for other networks and other sub-networks. Also, the transportation of data or network between access points to the public is backhaul. Backhaul connects the central network to the individual networks or public networks.

Further, the method may include at 156, the step of recovering, by a synchronization block equipped inside the Backhaul NIC (114), a clock signal from the backhaul network (112). Ethernet is fundamentally an asynchronous protocol, optimized for the bursty nature of data traffic. One of the final pieces missing from a total convergence to Ethernet is the ability to provide timing natively within the network. The synchronization block provides the necessary timing synchronization required.

Furthermore, the method (150) may include at 158, the step of supporting, by a Soft-Decision Forward Error Correction (SD-FEC) module (116), a Low Density Parity Check (LDPC) decoding and encoding and Turbo code decoding. SD FEC can additionally give a confidence factor in the decision used by receiver to decide between 1 and 0 meaning how far is the signal level from 1 or 0 this results in an additional coding gain of 1 to 2 DB and hence resulting in overall improvement of 20% to 40% for distance reachability. Soft Decision FEC can additionally provide longer distances and few regenerators.

Figure 2:
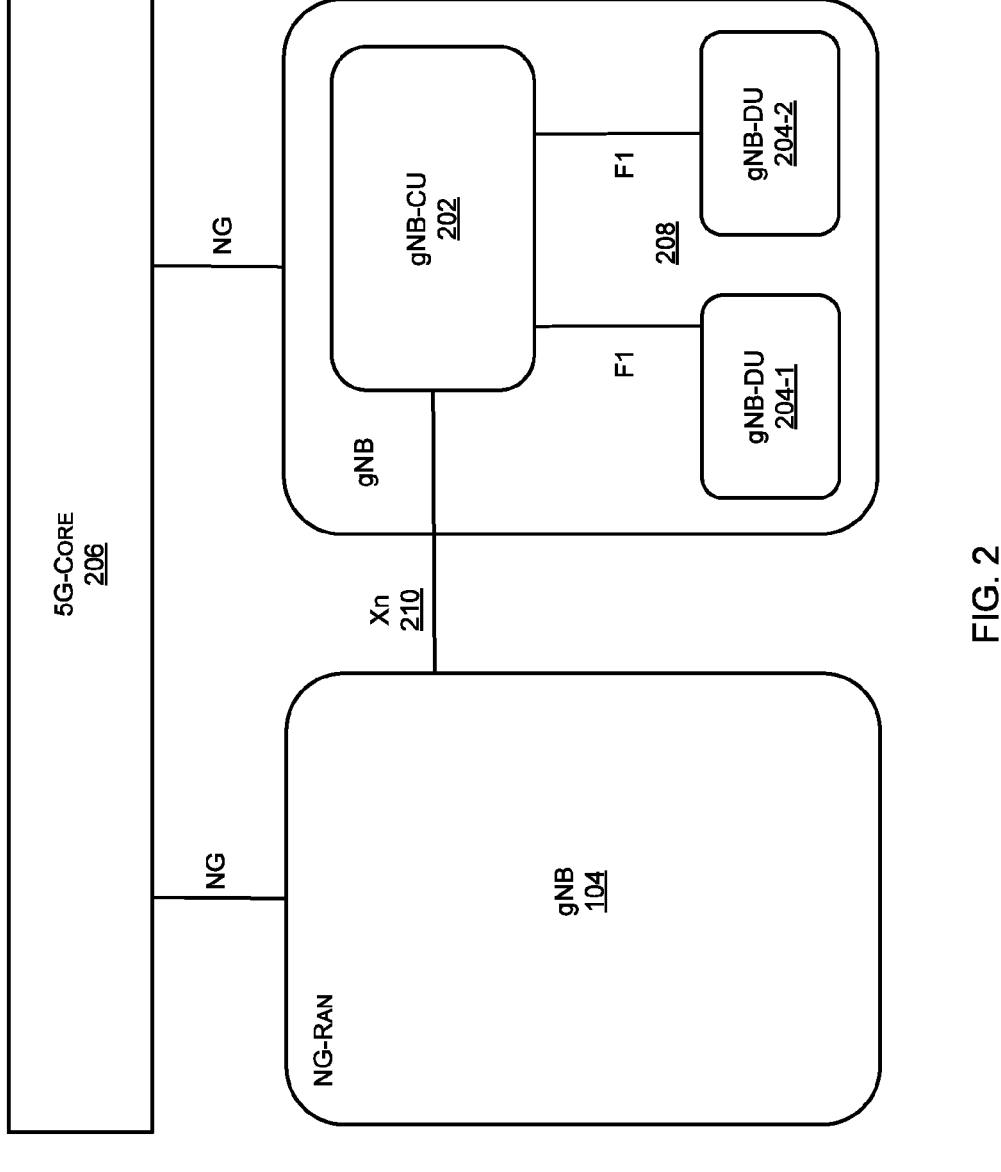
FIG. 2 illustrates an exemplary existing representation of a Centralized unit and a distributed unit of a gNodeB.

Generally, an existing gNodeB internal structure (200) for a 5G core (206) is shown in FIG. 2 where it can be quite clear to a person not skilled in the art that the existing CU (202) and DU (204) are separate units connected by an F1 interface (208).

Figure 3:
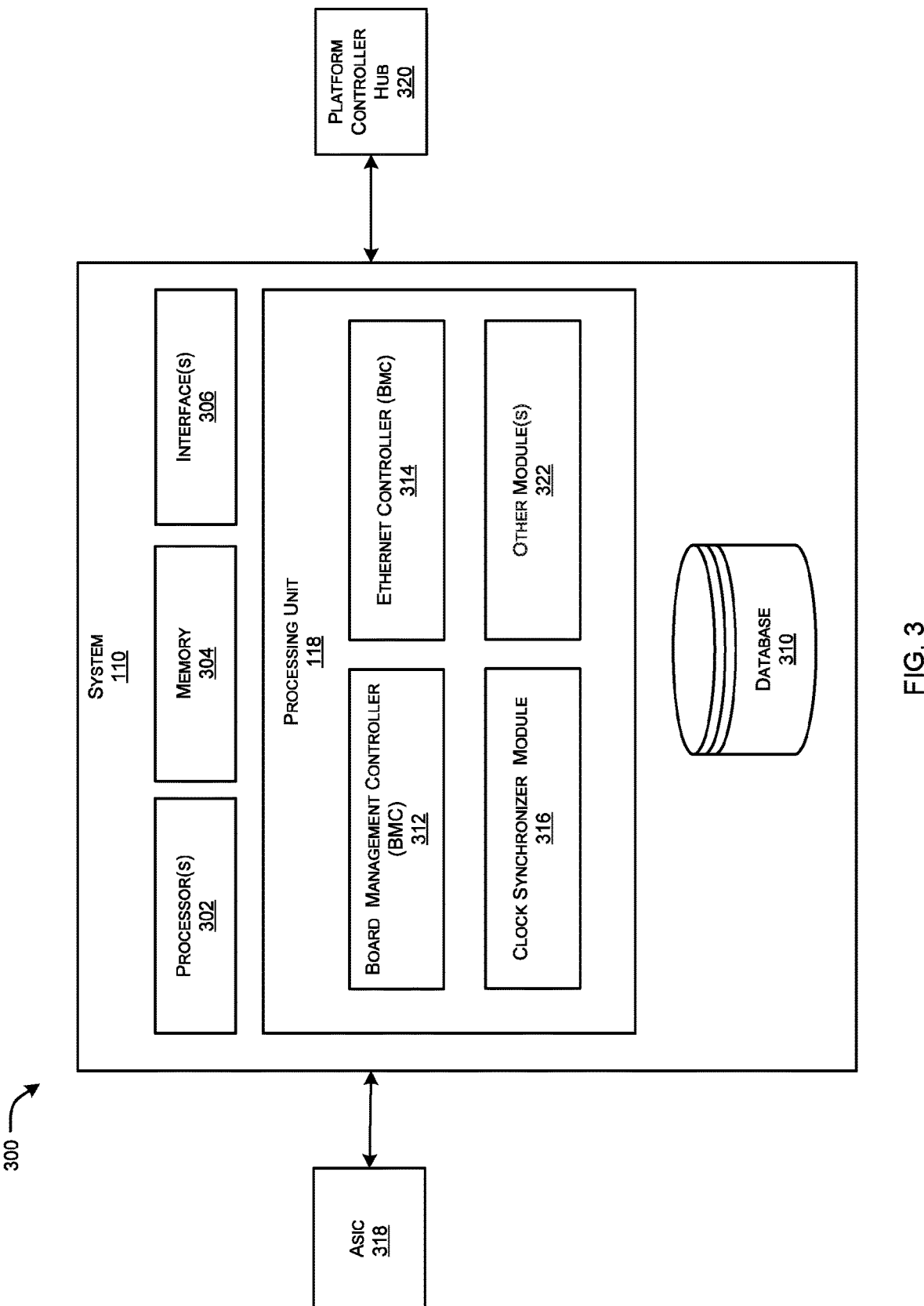
FIG. 3 illustrates an exemplary processing unit diagram of the CCDU, in accordance with an embodiment of the present disclosure.

In an exemplary embodiment, as illustrated in FIG. 3, the system (110) or the CCDU (106) may include one or more processors coupled with a memory, wherein the memory may store instructions which when executed by the one or more processors may cause system (110) to perform L1 and L2 functionalities. The one or more processor(s) (302) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (302) may be configured to fetch and execute computer-readable instructions stored in a memory of the CCDU (106). The memory may be configured to store one or more computer-readable instructions or routines in a non-transitory computer-readable storage medium, which may be fetched and executed to create or share data packets over a network service. The memory (304) may comprise any non-transitory storage device including, for example, volatile memory such as RAM, or non-volatile memory such as EPROM, flash memory, and the like.

In an embodiment, the system (110) may include a plurality of interfaces (306). The interfaces (306) may comprise a variety of interfaces, for example, interfaces for data input and output devices, referred to as I/O devices, storage devices, and the like. The interfaces (306) may facilitate communication of the system (110) with a plurality of platforms such as a platform controller hub (320) and an ASIC (318) comprising of (System on Chip) SoC components associated with the functioning of CCDU (106). In an exemplary embodiment, the SoC may include but not limited to the Soft-Decision Forward Error Correction (SD-FEC) module (116). The interface(s) (306) may also provide a communication pathway for one or more components of the CCDU (106). Examples of such components include, but are not limited to, processing unit/engine(s) (118) and a database (310).

In an exemplary embodiment, the CCDU (106) may be designed for an outdoor application to operate over a predefined temperature range and a predefined environment condition unlike COTS (Commercial of the shelf s) servers which are used in AC environment. For example, the predefined temperature range may go be from 0° to at least 60° C. in desert and other tropical and equatorial areas while predefined environment condition may include dry, humid, cold or dusty environment. In an embodiment the housing unit houses the single integrated board.

Furthermore, in an embodiment, the accelerator unit in the system may be configured to accelerate the functionalities associated with higher layers of a network protocol stack and functionalities associated with lower layers of the protocol stack.

In an exemplary embodiment, the CCDU in the single board can have a chip down approach wherein one or more components corresponding to the NIC cards may be part of the single board that increases the mean time between failures (MTBF) and reduces the costs significantly. Since, the components are all combined in a single board hence separate components (cards) may not be required rather a single board may be used which will reduce not only the process of manufacturing but also will reduce the cost and increase the system reliability.

In an exemplary embodiment, the system (110) may be assembled in a single board (interchangeably referred to as LAN on motherboard (LOM)) having a predefined number of layers. The predefined number of layers ensure that the system is not bulky and heavy. In a way of example but not limitation, the predefined number of layers can be at least 14. In an example the system (110) may include one or more network connections directly connected to the LOM. Instead of requiring a separate network interface card to access a local-area network, such as Ethernet, the circuits may be placed on a single board. An advantage of the system (110) can be an extra available peripheral component interconnect express (PCIe) slot that is not being used by a network adapter.

In an exemplary embodiment, the system (110) may include at least Four (x4) 25G Fiber Optic (SFP) but not limited to it as a fronthaul connection to the fronthaul NIC (120) on but not limited to an eCPRI protocol and at least two (x2) 10G Fiber Optic (SFP) as a backhaul connection to the backhaul network (112).

In an exemplary embodiment, the system (110) may be further coupled to one or more alarm devices (not shown in the FIG. 1B) that may send alarm signals over dry contacts, temperature rise, critical environment conditions and critical electronic conditions. The system (110) may operate in a standard telecom power supply of −48 VDC but not limited to it with all required protection for telecom sites.

The processing unit/engine(s) (118) may be implemented as a combination of hardware and programming (for example, programmable instructions) to implement one or more functionalities of the processing unit (118). In the examples described herein, such combinations of hardware and programming may be implemented in several different ways. For example, the programming for the processing unit (118) may be processor-executable instructions stored on a non-transitory machine-readable storage medium and the hardware for the processing unit (118) may comprise a processing resource (for example, one or more processors), to execute such instructions. In the present examples, the machine-readable storage medium may store instructions that, when executed by the processing resource, implement the processing unit (118). In accordance with such examples, the system (110) may include the machine-readable storage medium storing the instructions and the processing resource to execute the instructions, or the machine-readable storage medium may be separate but accessible to the CCDU (106) and the processing resource. In other examples, the processing engine(s) (118) may be implemented by electronic circuitry.

The processing unit (118) may include one or more modules/engines selected from any of a base mode management controller (BMC) (312), Local area Network controllers (314) (interchangeably referred to as the Ethernet controllers (314) herein), a clock synchronizer module (316), and other module(s) (322).

FIG. 1C illustrates an exemplary method flow diagram of the present disclosure can be implemented, in accordance with an embodiment of the present disclosure.

Network Enabled Controller

In an exemplary embodiment, the local network or the Ethernet Controller (314) may be provided for the fronthaul NIC (120) connectivity with the RU (108). The Ethernet controller (314) may further include the backhaul NIC (114) provided as a connectivity to the backhaul network (112).

In an exemplary embodiment, the Fronthaul NIC (120) may be associated with at least three 25 Gbps interface under evolved Common Public Radio Interface (eCPRI) protocol that can provide connectivity with the Radio unit (108) and may include an built-in synchronization block such as IEEE1588 block to perform any or a combination of enhanced Common Public Radio Interface (eCPRI) and ORAN functionality but not limited to the like.

In an exemplary embodiment, the Backhaul NIC (114) may provide connectivity with at least but not limited to two 1G/10 Gbps optical Ethernet to the backhaul network (112). The backhaul NIC (114) may further include a synchronization block such as but not limited to IEEE1588 block. In an example, the synchronization block may be configured to recover 1588 Clock from the backhaul network (112). In an exemplary embodiment, the fronthaul NIC (120) and the backhaul NIC (114) may be embedded in the single PCB board.

In an embodiment, a backhaul connectivity for the Backhaul NIC may be provided with, but not limited to, a 1×10 Gbps optical Ethernet.

eASIC

The enhanced ASIC (318) may include the accelerator unit. The accelerator unit may further include the Soft-Decision Forward Error Correction (SD-FEC) module (120) and may be one of the components of the Ethernet controller (314). In an example, the SD-FEC module (120) can support Low Density Parity Check (LDPC) decoding and encoding and Turbo code decoding. The LDPC codes used are highly configurable, and the specific code used can be specified on a codeword-by-codeword basis. The SD-FEC module (120) forms the basis of 5G network communication. Hence the eASIC must be embedded accurately and correctly with the ethernet controllers to support working of the CCDU in the single PCB board.

In an embodiment, the SD-FEC module (120) may be embedded on the board to facilitate assembly of the CCDU in the single PCB board.

Further, in an embodiment, at least eight dynamic random-access memory integrated circuits or modules such as but not limited to Double Data Rate Fourth Generation (DDR4) dual in line memory modules (DIMM) interfaces may be embedded in the e-ASIC (314). In an example, the DDR4 DIMM may be connected with the processing unit (118) and at least five 1 GB DDR4 may be connected with the e-ASIC (318). In an exemplary embodiment, other interfaces such as the Ethernet, USB/UART may be connected with the processing unit (118) through the platform controller Hub (PCH) (320) associated with the e-ASIC (314).

In an exemplary embodiment, a communication network may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In an embodiment, the one or more user equipments (102) may communicate with the system (110) via set of executable instructions residing on any operating system, including but not limited to, Android™, iOS™, Kai OS™ and the like. In an embodiment, the one or more user equipments (102) and the one or more mobile devices may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the one or more user equipments (102), and the one or more mobile devices may not be restricted to the mentioned devices and various other devices may be used. A smart computing device may be one of the appropriate systems for storing data and other private/sensitive information.

Exemplary Computer System 400

Figure 4:
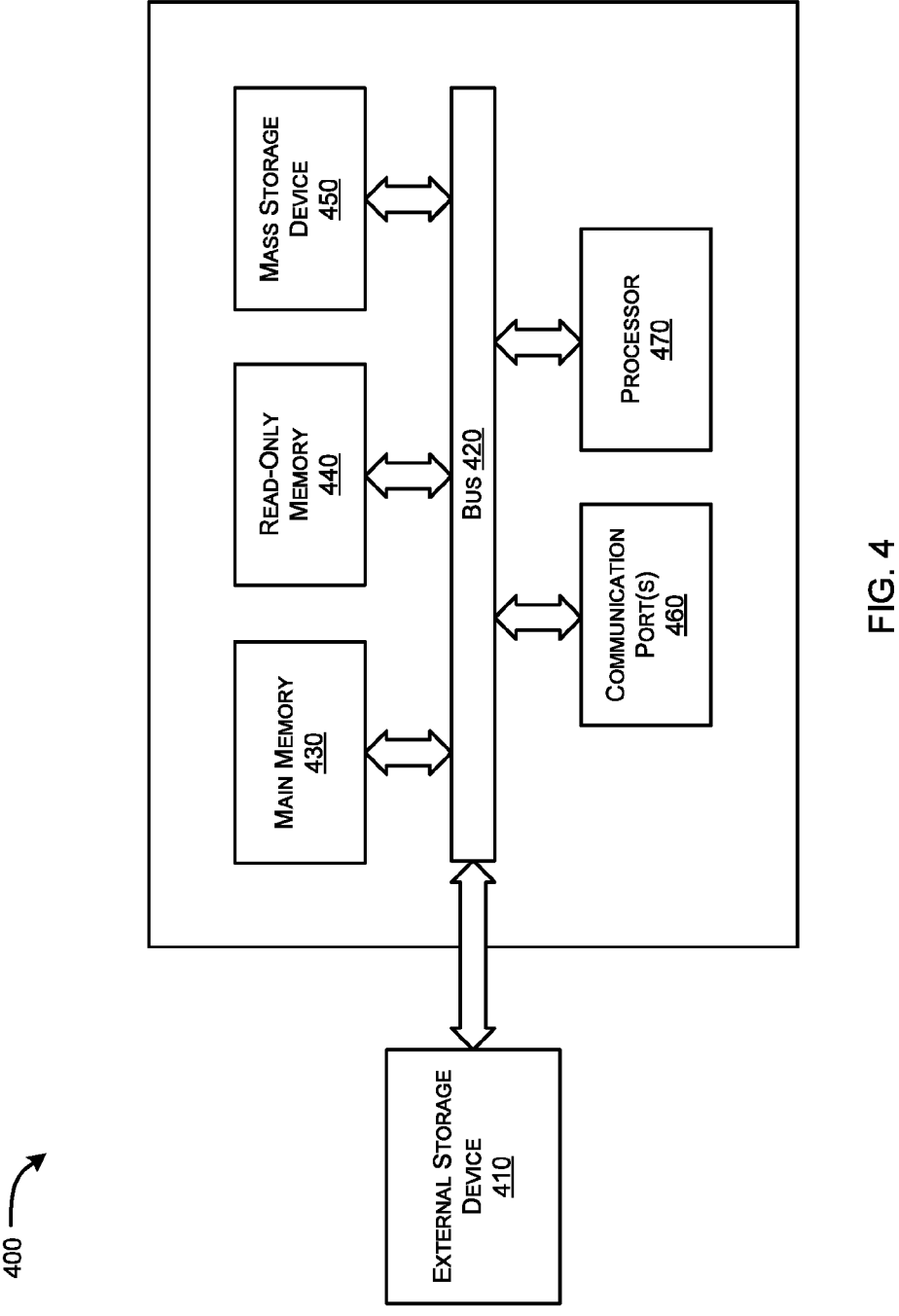
FIG. 4 illustrates an exemplary computer system in which or with which embodiments of the present invention can be utilized in accordance with embodiments of the present disclosure.

FIG. 4 illustrates an exemplary computer system in which or with which embodiments of the present invention can be utilized in accordance with embodiments of the present disclosure. As shown in FIG. 4, computer system 400 can include an external storage device 410, a bus 420, a main memory 430, a read only memory 440, a mass storage device 450, communication port 460, and a processor 470. Processor 470 may include various modules associated with embodiments of the present invention. Communication port 460 can be any of an RS-232 port for use with a modem based dialup connection, a 10/100 Ethernet port, a Gigabit or 10 Gigabit port using copper or fibre, a serial port, a parallel port, or other existing or future ports. Communication port 460 may be chosen depending on a network, such a Local Area Network (LAN), Wide Area Network (WAN), or any network to which computer system connects. Memory 430 can be Random Access Memory (RAM), or any other dynamic storage device commonly known in the art. Read-only memory 440 can be any static storage device(s) e.g., but not limited to, a Programmable Read Only Memory (PROM) chips for storing static information e.g., start-up or BIOS instructions for processor 470. Mass storage 450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays).

Bus 420 communicatively couples processor(s) 470 with the other memory, storage and communication blocks. Bus 420 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 470 to software system.

Optionally, operator and administrative interfaces, e.g. a display, keyboard, and a cursor control device, may also be coupled to bus 420 to support direct operator interaction with a computer system. Other operator and administrative interfaces can be provided through network connections connected through communication port 460. Components described above are meant only to exemplify various possibilities. In no way should the aforementioned exemplary computer system limit the scope of the present disclosure.

Thus, the present disclosure provides a unique and efficient hardware architecture design of a Combined centralized and Distributed Unit (CCDU) that can provide the functionality of CU and DU with a single box solution. The CCDU is designed for the outdoor application to operate over wide temperature range and different environment condition unlike Commercial of the shelf (COTs) servers which are used in AC environment quiet often. The CCDU have a chip down approach where all the components corresponding to the NIC cards are part of the single board which increases the Mean Time Between Failures (MTBF) and reduces cost significantly.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS) 38.816 and the like.

ADVANTAGES OF THE PRESENT DISCLOSURE

Some of the objects of the present disclosure, which at least one embodiment herein satisfies are as listed herein below.

The present disclosure provides for a system in a single unit to reduce cost and increase reliability.

The present disclosure provides for a local area network controller Hardware design that is on a single PCB approach by keeping all required SoC on board.

The present disclosure provides for a system that can manage one or more network interfaces in a single PCB.

The present disclosure provides for a system that operates at standard telecom power supply (−48 VDC) with all required protection for telecom sites.

We claim:

1. A network enabled controller system for a combined centralized and distributed unit (CCDU) system, said system comprising:
    a housing for a controller, said controller operatively coupled to a processing unit of the CCDU, wherein the controller further comprises:
    an accelerator unit, said accelerator unit accelerates a set of functionalities of the CCDU;
    a fronthaul Network interface controller (NIC) (120), said fronthaul NIC is communicatively coupled with a radio unit (RU) (108); and
    a backhaul NIC communicatively coupled to a backhaul network (112); and
    and one or more network interfaces, wherein said controller including the accelerator unit, the fronthaul NIC, and the backhaul NIC is embedded in a single printed circuit board with the processing unit of the CCDU as a system on chip (SoC).

2. The system as claimed in claim 1, wherein the Fronthaul NIC (120) is configured with an interface under-evolved Common Public Radio Interface (eCPRI) protocol with the Radio unit (108).

3. The system as claimed in claim 2, wherein the Fronthaul NIC further comprises an built-in synchronization block to perform any or a combination of enhanced Common Public Radio Interface (eCPRI) and ORAN functionality.

4. The system as claimed in claim 1, wherein the Backhaul NIC (114) provides connectivity with configured optical Ethernet.

5. The system as claimed in claim 4, wherein the backhaul NIC (114) further comprises a synchronization block to recover a Clock signal from the backhaul network (112).

6. The system as claimed in claim 1, wherein the accelerator unit further comprises a Soft-Decision Forward Error Correction (SD-FEC) module (116).

7. The system as claimed in claim 6, wherein the SD-FEC module (116) supports a Low Density Parity Check (LDPC) decoding and encoding and Turbo code decoding.

8. The system as claimed in claim 1, wherein at least eight dynamic random-access memory integrated circuits or modules are embedded in the single integrated board, wherein and at least five 1 GB DDR4 are connected with the single integrated circuit.

9. The system as claimed in claim 1, wherein the one or more connection interfaces are connected with the processing unit (118) through the platform controller Hub (PCH) (320) associated with the single integrated board.

10. The system as claimed in claim 1, wherein the controller is enabled by a local area network.

11. A method performed by a network enabled controller system for a combined centralized and distributed unit (CCDU) system, the method comprising:
    performing a combination of enhanced Common Public Radio Interface (eCPRI) and ORAN functionality;
    providing connectivity by a Backhaul NIC (114) with configured optical Ethernet;
    recovering, by a synchronization block equipped inside the Backhaul NIC (114), a Clock signal from the backhaul network (112); and supporting, by a Soft-Decision Forward Error Correction (SD-FEC) module (116), a Low Density Parity Check (LDPC) decoding and encoding and Turbo code decoding, wherein the SD-FEC module (116) is equipped inside an accelerator unit to give a confidence factor for deciding a signal between 1 and 0.

12. A non-transitory computer readable medium comprising processor executable instructions that cause a processor to:

perform a combination of enhanced Common Public Radio Interface (eCPRI) and ORAN functionality;

provide connectivity by a Backhaul NIC (114) with configured optical Ethernet;

recover, by a synchronization block equipped inside the Backhaul NIC (114), a Clock signal from the backhaul network (112); and support, by a Soft-Decision Forward Error Correction (SD-FEC) module (116), a Low Density Parity Check (LDPC) decoding and encoding and Turbo code decoding, wherein the SD-FEC module (116) is equipped inside an accelerator unit to give a confidence factor for deciding a signal between 1 and 0.

\* \* \* \* \*